(12) United States Patent
Horng et al.

(10) Patent No.: US 6,624,541 B2
(45) Date of Patent: Sep. 23, 2003

(54) STATOR WITH A RADIAL WINDING AND METHOD FOR MANUFACTURING SAME

(75) Inventors: Alex Horng, Kaohsiung (TW); Ching-Shen Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 16 days.

(21) Appl. No.: 09/888,403

(22) Filed: Jun. 26, 2001

(65) Prior Publication Data

US 2002/0195900 A1 Dec. 26, 2002

(51) Int. Cl.[7] .................. H02K 15/12; H02K 37/00
(52) U.S. Cl. ............... 310/45; 310/40 R; 310/216; 310/217; 310/218; 310/67 R
(58) Field of Search ............... 310/45, 40 R, 310/216, 217, 218, 67 R, 186; H02K 1/06

(56) References Cited

U.S. PATENT DOCUMENTS

| | | | | |
|---|---|---|---|---|
| 3,296,472 A | * | 1/1967 | Fisher | 310/186 |
| 4,355,249 A | * | 10/1982 | Kenwell | 310/49 R |
| 4,554,491 A | * | 11/1985 | Plunkett | 318/254 |
| 5,095,238 A | * | 3/1992 | Suzuki et al. | 310/156.46 |
| 5,739,615 A | * | 4/1998 | McClelland | 310/186 |
| 5,789,834 A | * | 8/1998 | Katoh et al. | 310/67 R |
| 5,859,487 A | * | 1/1999 | Chen | 310/254 |
| 5,967,763 A | * | 10/1999 | Horng | 417/423.7 |
| 6,384,505 B1 | * | 5/2002 | Horng et al. | 310/186 |
| 6,407,473 B1 | * | 6/2002 | Horng et al. | 310/68 B |
| 6,441,531 B1 | * | 8/2002 | Horng et al. | 310/216 |
| 6,512,319 B1 | * | 1/2003 | Horng et al. | 310/254 |
| 6,534,893 B2 | * | 3/2003 | Horng et al. | 310/254 |

* cited by examiner

Primary Examiner—Nestor Ramirez
Assistant Examiner—J. Aguirrechea
(74) Attorney, Agent, or Firm—Bacon & Thomas, PLLC

(57) ABSTRACT

A stator with a radial winding and a method for manufacturing such a stator provides a plurality of pole plates made of a magnetically conductive material. Each pole plate comprises a hub and at least two poles extending radially outward from the hub. The poles are spaced by an identical angular interval. Each pole has a distal end with a magnetic pole face. A metal wire is wound around the poles of the pole plates, thereby forming a pole plate assembly. At least two of the pole plate assemblies are assembled together with the poles of the pole plate assemblies disposed alternately.

8 Claims, 5 Drawing Sheets

STATOR WITH A RADIAL WINDING AND METHOD FOR MANUFACTURING SAME

BACKGROUND OF THE INVENTION

1. Field of the Invention

The present invention relates to a stator with a radial winding and a method for manufacturing such a stator, thereby providing a stator that can be easily manufactured and that has a larger rotating torque.

2. Description of the Related Art

FIG. 1 of the drawings illustrates a stator with a conventional radial winding. The stator comprises a plurality of silicon-steel plates 90 of identical shape and size and having a central hole 94 for rotatably receiving an axle tube, which, in turn, rotatably receives a shaft (not shown) of a rotor (not shown). Each silicon-steel plate 90 includes even-numbered poles 91 and a pole face 92 is formed by the distal ends of the stacked poles 91 of the silicon-steel plates 90. The plates 91 having a metal wire 93 wound therearound, and the pole faces 92 of the stator and the permanent magnet (not shown) of the rotor inductively couple each other.

In the stator having such a conventional radial winding, each two angularly adjacent poles 93 of the stacked silicon-steel plates 90 have a relatively small gap therebetween, which results in a difficult and touchy winding procedure. If the gap between the pole faces 92 of the respective poles 91 is increased, the inductive surface area between the stator and the rotor is be reduced. As a result, the rotating torque of the rotor is reduced. In addition, the cogging torque is increased, which causes trembling in the rotation of the rotor. Furthermore, in the stator having such a conventional radial winding, if the diameter of the metal wire 93 wound around the poles 91 of the stacked silicon-steel plates 91 is increased for increasing the rotating torque of the rotor, the metal wire 93 wound around the poles 91 tends to be have a friction contact with an end edge of the pole face 92, which damages a layer of paint covering the metal wire 93. Thus, the winding cannot be proceeded easily and the ratio of disqualified products to qualified products is increased. Manufacture of stators with many poles is more difficult in view of the above-mentioned problems.

SUMMARY OF THE INVENTION

It is an object of the present invention to provide a stator with a radial winding and a method for manufacturing such a stator, wherein the winding and manufacture procedure for the stator can be accomplished easily to thereby reduce the cost and expense for manufacture.

It is another object of the present invention to provide a stator with a radial winding and a method for manufacturing such a stator, wherein the winding and manufacture procedure for the stator can be accomplished easily to thereby reduce the ratio of disqualified products to qualified products.

It is a further object of the present invention to provide a stator with a radial winding and a method for manufacturing such a stator, wherein the winding and manufacture procedure for the stator can be accomplished easily and wherein the diameter of the metal wire to be wound around each of the poles of the stator can be increased to thereby increase the rotating torque of the rotor.

It is still another object of present invention to provide a stator with a radial winding and a method for manufacturing such a stator, wherein the inductive area between the stator and the rotor is increased to thereby increase the rotating torque of the rotor.

A stator with a radial winding and a method for manufacturing such a stator in accordance with the present invention provides a plurality of pole plates made of a magnetically conductive material. Each pole plate comprises a hub and at least two poles extending radially outward from the hub. The poles are spaced by an identical angular interval. Each pole has a distal end with a magnetic pole face. A metal wire is wound around the poles of the pole plates, thereby forming a pole plate assembly. At least two of the pole plate assemblies are assembled together with the poles of the pole plate assemblies disposed alternately.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 1:
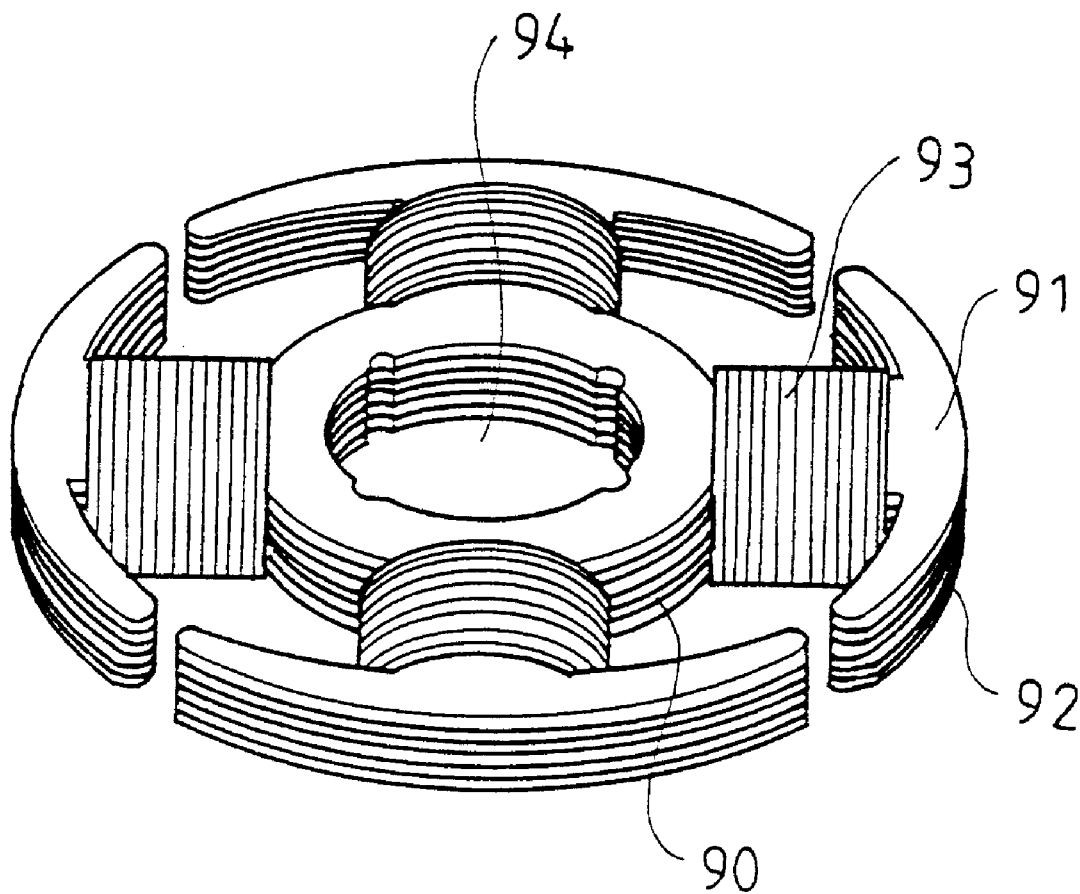
FIG. 1 is a perspective view of a stator with a conventional radial winding.
Figure 2:
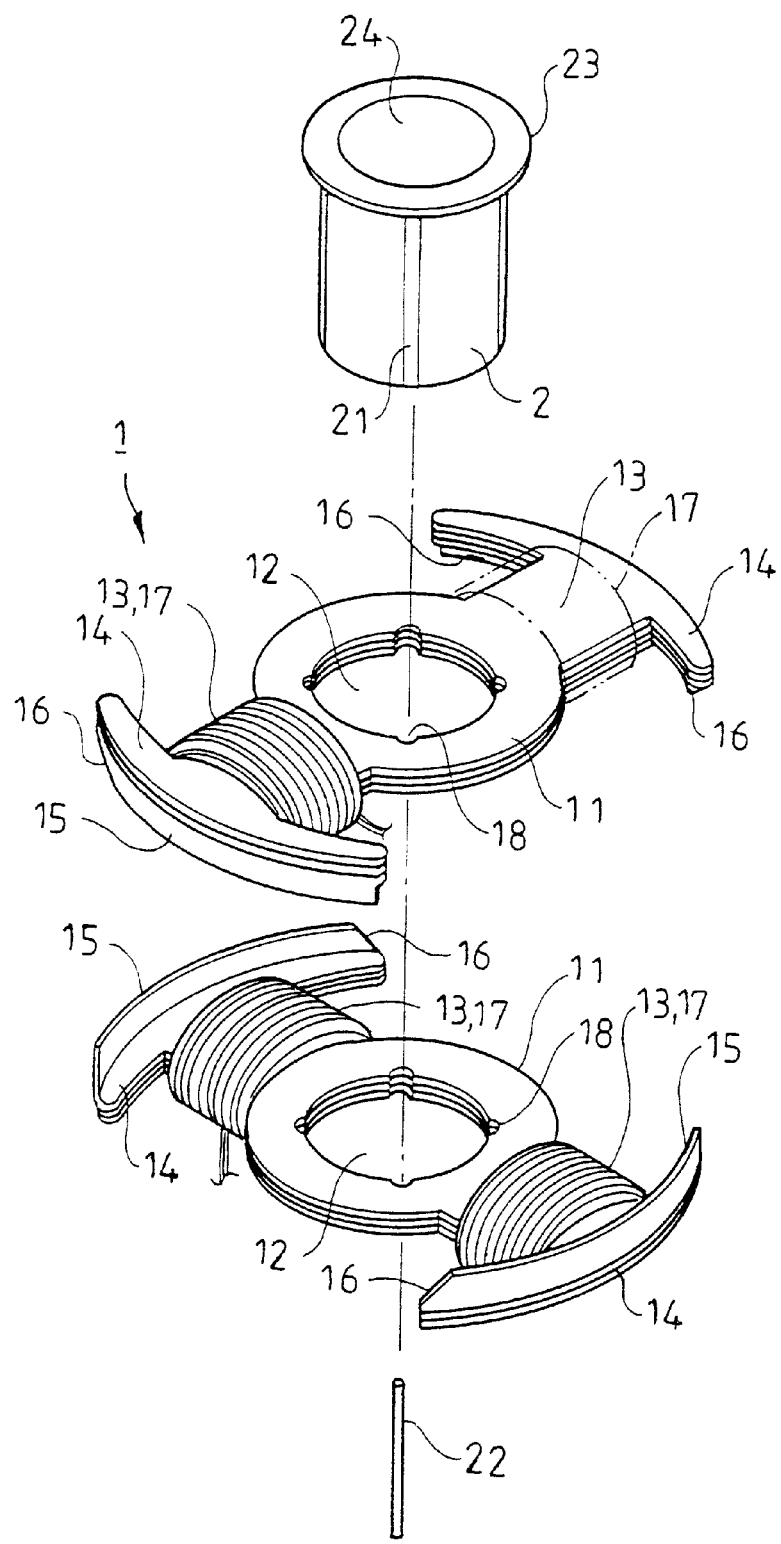
FIG. 2 is an exploded perspective view of a first embodiment of a stator in accordance with the present invention.

Referring to FIG. 2, a first embodiment of a stator in accordance with the present invention generally comprises at least two pole plate assemblies 1 and an engaging member 2 for engaging the pole plate assemblies 1 together.

Each pole plate assembly 1 comprises a plurality of identical silicon-steel plates (pole plates) made of magnetically conductive metallic material. Namely, each pole plate assembly 1 is formed by stacking a plurality of silicon-steel plates of identical size and shape. Each pole plate assembly 1 comprises a central hub 11 having a central hole 12 through which the engaging member 2 extends. The hub 11 includes a plurality of poles 13 extending radially outward therefrom, the poles 13 being spaced by an identical angular interval. When assembling the pole plate assemblies 1 together by the engaging member 2, the poles 3 of one of the pole plate assemblies 1 are respectively placed n the spaces between the poles of the other pole plate assembly 1 such that the poles 13 of one of the pole plate assemblies 1 and the poles 13 of the other pole plate assembly 1 are alternatively disposed.

A magnetic pole face 14 is formed on a distal end of each pole 13. In a preferred embodiment of the invention, one or two of the magnetic pole faces 14 are extended along a vertical direction to thereby form a larger inductive face 15. In addition, in order to start the rotor more easily, the two ends of the inductive face 15 are provided with asymmetric portions 16 by means of providing a chamfered edge and an inclined shoulder on an end of the inductive face 15, or by providing the two ends of the inductive face 15 with different thicknesses. Thus, when the permanent magnet (not shown) of the rotor (not shown) and the inductive face 15 of the stator induce each other, the rotor can be started easily.

A metal wire 17 can easily be wound around the poles 13 of the pole assembly 1 to the required turns according to the positions of the poles 13. During the winding procedure, the metal wire 17 is provided with a larger space for winding, which means that damage to the metal wire 17 is prevented and that a metal wire of a larger diameter can be used in winding.

The engaging member 2 assembles the at least two pole plate assemblies 1 together. In the preferred embodiment, the engaging member 2 can be in fitting engagement with the central holes 12 of the pole plate assemblies 1, and the poles 13 of the pole plate assemblies 1 are spaced by an identical angular interval about the center of the engaging member 2. Alternatively, as illustrated in FIG. 2, the engaging member 2 may include a plurality of grooves 21 that are spaced by an identical angular interval. An inner periphery defining the central hole 12 of each pole plate assembly 1 has a plurality of aligned grooves 18 that are spaced by an identical angular interval and that face the grooves 21 of the engaging member 2, respectively. A pin 22 is inserted into the grooves 18 and 21 to thereby secure the engaging member 2 and the hubs 11 of the pole plate assemblies 1 together. In another embodiment, the engaging member 2 may include a plurality of grooves or ribs that are spaced by an identical angular interval. The inner periphery of the central hole 12 of each pole plate assembly 1 has a plurality of ribs or grooves that are spaced by an identical angular interval and that engage with the grooves or ribs of the engaging member 2, respectively. The engaging member 2 may further include a flange 23 on an end thereof for preventing disengagement of the pole plate assemblies 1. The engaging member 2 further include a central hole 24 into which a bearing (not shown) is mounted for rotatably receiving a shaft (not shown) of the rotor.

Figure 3:
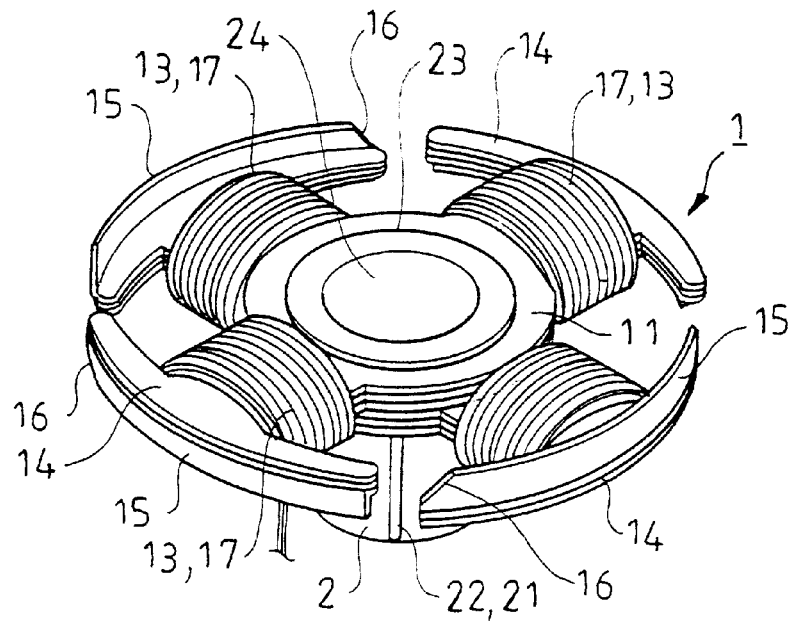
FIG. 3 is a perspective view of the stator in FIG. 2.
Figure 4:
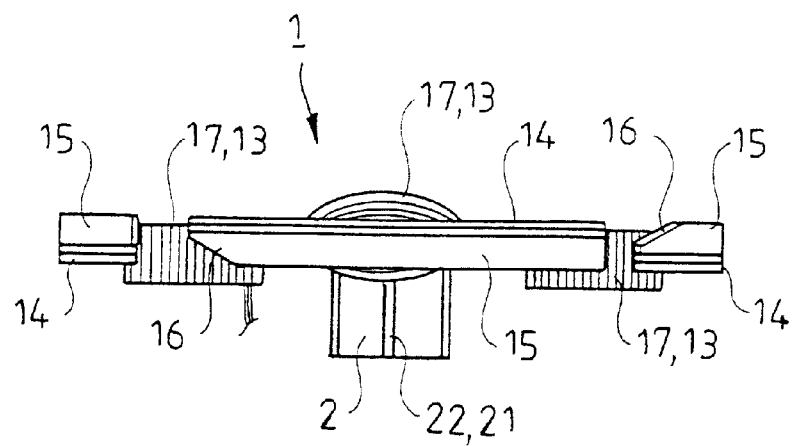
FIG. 4 is an elevational view of the stator in FIG. 3.

Referring to FIGS. 3 and 4, in a method for manufacturing the stator having the above-mentioned structure in accordance with the present invention, a metal wire 17 is wound around the poles 13 of each pole plate assembly 1 to the required turns, and the terminals of the metal wire 17 are connected to a power source. After each of the pole plate assemblies 1 have been wound by the metal wire 17, the central holes 12 of the pole plate assemblies 1 are aligned with each other, whereas the poles 13 of the pole plate assemblies 1 are spaced by an identical annular interval. The engaging member 2 is then extended through the aligned central holes 12. Thus, the engaging member 2 and the pole plate assemblies 1 are securely engaged together to form a stator with a radial winding.

Figure 5:
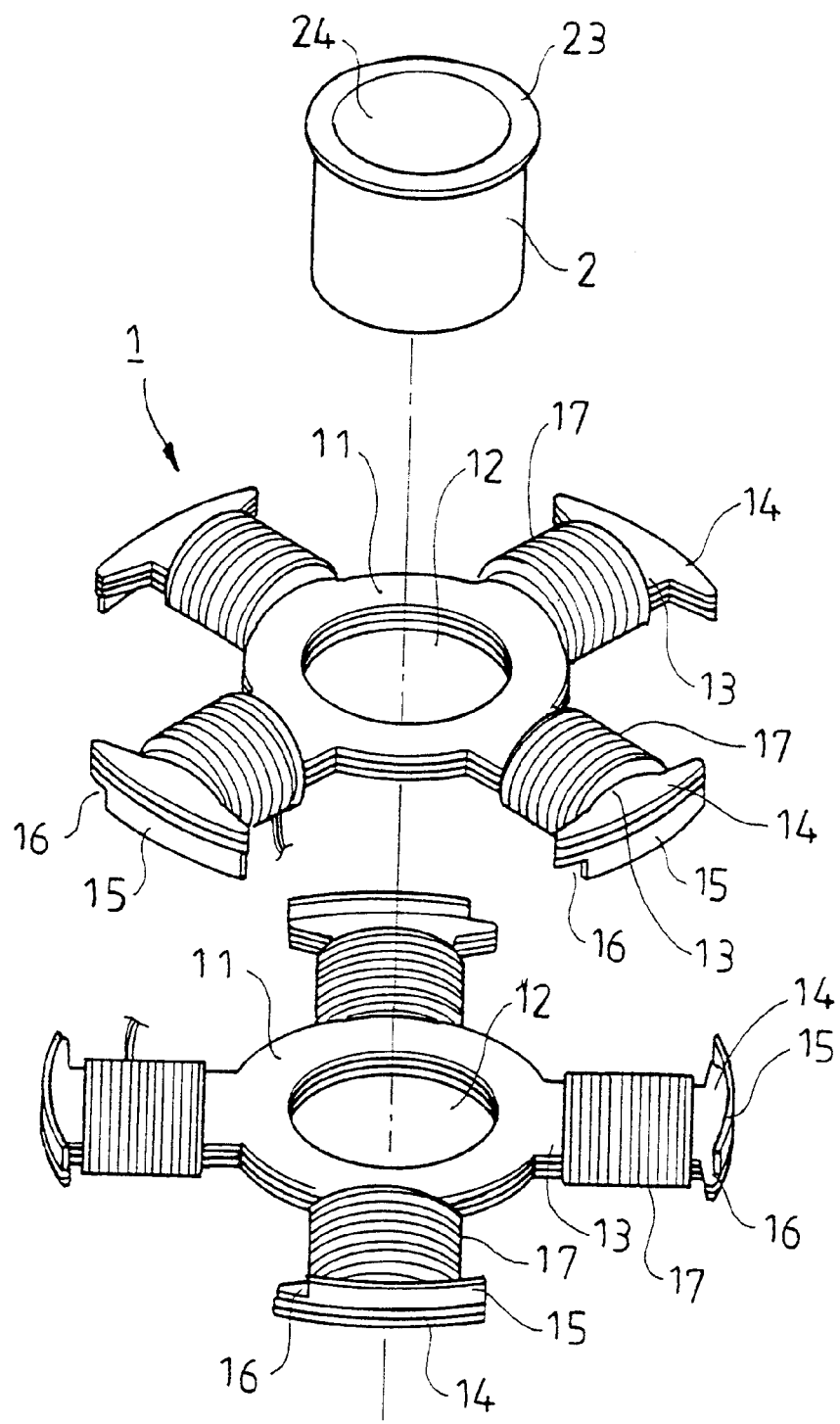
FIG. 5 is an exploded perspective view of a second embodiment of the stator in accordance with the present invention.

FIG. 5 illustrates a second embodiment of the stator in accordance with the present invention, wherein the stator comprises at least two pole plate assemblies 1 and an engaging member 2. Each pole plate assembly 1 comprises a plurality of silicon-steel plates of identical shape and size. Each pole plate assembly 1 comprises a hub 11 from which four poles 13 extend radially outward, the poles 13 being angularly spaced by 90 degrees. A metal wire 17 is wound around the poles 13 of the stacked silicon-steel plates. A magnetic pole face 14 is formed on a distal end of each pole 13. The magnetic pole face 14 may extend vertically to form an inductive face 15. Thus, each pole plate assembly 1 has a larger inductive area. In addition, the inductive face 15 may include two asymmetric ends 16 identical to those in the above embodiment.

Figure 6:
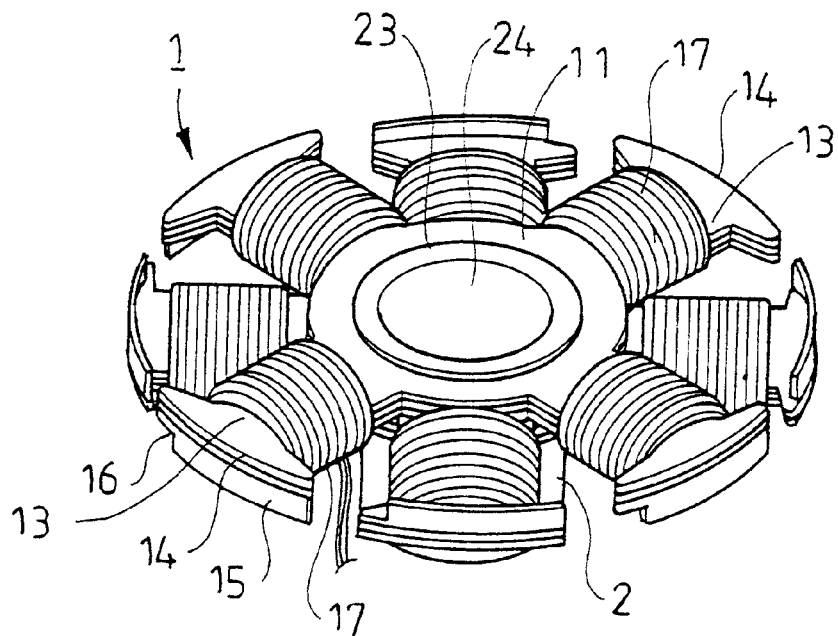
FIG. 6 is a perspective view of the stator in FIG. 5.
Figure 7:
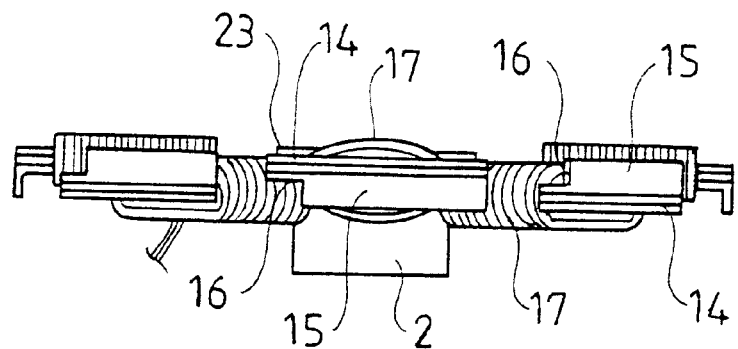
FIG. 7 is an elevational view of the stator in FIG. 6.

Referring to FIGS. 6 and 7, when the poles 13 of the pole plate assemblies 1 are spaced by an identical annular interval after engagement of the pole plate assemblies 1, the engaging member 2 is then extended through the aligned central holes 12. Thus, the engaging member 2 and the pole plate assemblies 1 are securely engaged together to form a stator with a radial winding.

In accordance with the stator with a radial winding and the method for manufacturing such a stator of the present invention, the poles 13 of each pole plate assembly 1 of the stator are separately wound by the metal wire 17 and the pole plate assemblies 1 are then engaged together by the engaging member 2 with the poles 13 of the pole plate assemblies alternately disposed and spaced by an identical angular interval. The angle between two adjacent poles 13 of each pole plate assembly 1 before the assembling procedure is relatively large, which allows easy winding while eliminating the risk of damage to the metal wire 17. The stator thus manufactured has a low cost, and expense and the ratio of disqualified products to qualified products is lowered. In addition, the diameter of the metal wire 17 can be increased and the inductive area of the magnetic pole faces 14 of the stator is increased to thereby increase the rotating torque and the twisting force of the rotor.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A stator with a radial winding, the stator comprising at least two separate pole plate assemblies, each said pole plate assembly comprising a plurality of pole plates made of a magnetically conductive material, each said pole plate assembly comprising a hub having a central hole and at least two poles extending radially outward from the hub, the poles being spaced by an identical angular interval, each said pole having a distal end with a magnetic pole face, each said pole having a metal wire wound therearound, wherein the at least two pole plate assemblies are coaxially stacked and the pole thereof are arranged in staggered manner to form the stator.

2. The stator with a radial winding as claimed in claim 1, wherein a number of said at least two pole plate assemblies is even, and further comprising an engaging member that extends through the central holes of the even-numbered pole plate assemblies that are aligned with each other, thereby assembling said pole plate assemblies together so that the poles of said at least two pole plate assemblies are disposed alternately and spaced by an identical angular interval, the engaging member having a central hole for rotatably receiving a rotor.

3. The stator with a radial winding as claimed in claim 1, wherein each said pole plate assembly comprises more than one silicon-steel plate that are stacked together.

4. The stator with a radial winding as claimed in claim 2, wherein the magnetic pole face on the distal end of each said pole of each said pole plate assembly comprises a vertically extending inductive face.

5. The stator with a radial winding as claimed in claim 4, wherein the inductive face of each said pole plate assembly Includes two ends, one of the ends of the inductive face of each said pole plate assembly having a chamfered edge.

6. The stator with a radial winding as claimed in claim 2, wherein the engaging member and each said pole plate assembly are in fitting engagement.

7. The stator with a radial winding as claimed in claim 2, wherein the engaging member includes a flange for preventing disengagement of each said pole plate assembly.

8. The stator with a radial winding as claimed in claim 2, wherein an inner periphery defining the central hole of each said pole plate assembly comprises at least one first groove, the engaging member comprising at least one second groove defined on an outer periphery thereof and facing said at least one first groove, further comprising a pin extending through said at least one first groove and said at least one second groove, thereby securing the engaging member and said at least two pole plate assemblies together.

* * * * *